(12) United States Patent
Chen et al.

(10) Patent No.: US 8,020,423 B2
(45) Date of Patent: Sep. 20, 2011

(54) ELECTRONIC CASING AND METHOD OF MANUFACTURING THE SAME

(75) Inventors: Chih-Yuan Chen, Kaohsiung (TW);
Chun-Chieh Wang, Kaoshiung (TW);
Tzyy-Ker Sue, Kaohsiung (TW);
Chin-Chuan Huang, Kaohsiung (TW);
Chi-Keung Chung, Kaoshsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 888 days.

(21) Appl. No.: 11/960,795

(22) Filed: Dec. 20, 2007

(65) Prior Publication Data

US 2008/0316685 A1    Dec. 25, 2008

(30) Foreign Application Priority Data

Jun. 21, 2007   (TW) ................. 96122386 A

(51) Int. Cl.
*B21D 31/00* (2006.01)
*B23P 25/00* (2006.01)
*H01F 7/06* (2006.01)

(52) U.S. Cl. ............... 72/363; 72/707; 29/458; 29/606

(58) Field of Classification Search ............ 72/56, 363, 72/379.2, 707; 29/592.1, 458, 606, 602.1; 439/76.1; 148/527
See application file for complete search history.

(56) References Cited

U.S. PATENT DOCUMENTS

| | | | |
|---|---|---|---|
| 4,852,736 A * | 8/1989 | Kojima et al. | 29/592.1 |
| 6,574,096 B1 | 6/2003 | Difonzo et al. | |
| 6,852,273 B2 * | 2/2005 | Ivanov et al. | 148/535 |

FOREIGN PATENT DOCUMENTS

| | | |
|---|---|---|
| JP | 3092598 | 12/2002 |
| JP | 2003-293059 | 10/2003 |
| JP | 2005-007464 | 1/2005 |
| JP | 2005-293919 | 10/2005 |
| JP | 2006-080028 | 3/2006 |
| JP | 2006-088435 | 4/2006 |
| JP | 2006-187802 | 7/2006 |

OTHER PUBLICATIONS

Japanese Patent Office Action Dated Mar. 23, 2011 With English Translation.
Korean Application dated May 31, 2011 in Korean Application No. 10-2008-0039817 with English Translation.

* cited by examiner

*Primary Examiner* — Teresa M Ekiert
(74) *Attorney, Agent, or Firm* — Volentine & Whitt, PLLC

(57) ABSTRACT

An electronic casing and a method of manufacturing the same are provided. The method includes the following steps. Step (a): a metal laminate and a die of a predetermined shape are provided. The metal laminate comprises a metal top layer and a metal bottom layer that are bonded by interface atom diffusion. Step (b): the metal laminate is processed to form a casing blank by using the die, and the casing blank has at least one turning portion. Step (c): a profiler of a predetermined shape and an electromagnetic forming device are provided. Step (d): the casing blank is attached to the profiler, and the electromagnetic forming device is disposed at a position corresponding to the turning portion. Step (e): the electromagnetic forming device is activated, so that the casing blank has a shape corresponding to the predetermined shape of the profiler.

6 Claims, 8 Drawing Sheets

ELECTRONIC CASING AND METHOD OF MANUFACTURING THE SAME

BACKGROUND OF THE INVENTION

1. Field of the Invention

The present invention relates to an electronic casing and a method of manufacturing the same. More particularly, the present invention relates to a method of manufacturing an electronic casing that enables the electronic casing to have desirable surface quality and an electronic casing manufactured thereby.

2. Description of the Related Art

With the rapid progress of our times and the rapid development of electronic products, more and more people carry with one or more portable electronic product, such as cell phone, PDA, or walkman. In the prior art, in order to improve the portability, the electronic products are developed to become lighter, thinner and smaller. Moreover, in order to reduce the weight, casings of the electronic products are often made of plastic such as polymer with a light weight.

However, plastic casings made of polymer are not as good as the metal products in terms of appearance and strength. Since plastic casings are neither shock-resistant nor abrasion-resistant, after being used for a long time, the casings of the products will suffer damage from shocks or abrasions, and the structural strength of the casings will also be weak.

FIG. 1 shows a casing structure of a conventional electronic product. As shown in FIG. 1, the casing of an electronic product at least includes a reflective layer 11 and a composite layer 12. The composite layer 12 is formed by polymers with particles 13 mixed therein. Then, metals such as aluminum, nickel, iron, copper or cobalt-chromium alloy are plated on the composite layer 12 through sputtering or electroplating, so as to form the reflective layer 11.

Though metal materials are plated on the plastic casing through sputtering or electroplating to improve the appearance of the casing, the strength of the casing is not improved significantly. Accordingly, some manufacturers make improvements by manufacturing casings entirely with metal materials.

However, conventional metal casings are often made of a single metal material, such as titanium-based material, stainless steel or aluminum-based material, among which aluminum-based material is the most commonly used. However, the added value of aluminum-based material is rather low. Titanium-based material has excellent surface quality as well as higher specific strength. However, titanium-based material has a strong springback after the common stamping process, such it is difficult to control the forming precision of the casings. While a hydraulic forming process, which has better forming forces, can be adopted to solve this problem, it is too slow for high-speed mass production. In addition, titanium-based material is poor electrical conductive, so an electromagnetic forming process cannot be used thereon. Therefore, it is difficult to manufacture casings with titanium-based material. As to stainless steel, it is relatively heavy, and, for similar reasons, the forming precision of stainless steel is also not desirable.

FIGS. 2A and 2B show a conventional forming process of electronic products. As shown in FIG. 2A, a metal casing 21 is formed by a stamping process in advance, so as to form a pre-formed body. A bending portion with a greater radius of curvature is formed at a turning portion 24, so in the reprocessing, as shown in FIG. 2B, one profiler 23 is disposed on each side of the turning portion 24 of the metal casing 21 (pre-formed body), and thus, the casing of an electronic product with better precision is formed by forging or stamping process 22. However, the forging or stamping process 22 often leaves scratches on the surface of the metal casing 21, which in turn affects the usefulness of the casing made of metal materials.

Therefore, it is necessary to provide an electronic casing and a manufacturing method thereof to solve the above problems.

SUMMARY OF THE INVENTION

The present invention is mainly directed to a manufacturing method of an electronic casing which uses a metal laminate for casing material that has surface quality of titanium-based materials or stainless steel and is not expensive, so as to reduce the cost of material as compared with single titanium-based materials or stainless steel, to improve the forming precision and quality, and to develop casing products with high surface quality and lower cost.

The present invention is also directed to a method of manufacturing an electronic casing which uses a titanium-based material or stainless steel and an aluminum-based material to form a metal laminate. The metal laminate replaces the conventional single material of titanium-based material or stainless steel, and serves as a base material for electronic products. Therefore, the top layer of the metal laminate is made of the titanium-based material (or stainless steel), which has desirable surface treatment properties, and has a graceful-looking texture; a bottom layer is made of the aluminum-based material, which offers fine formability, light weight and low price, and has desirable conductivity. Moreover, the aluminum-based material generates great eddy currents in the subsequent electromagnetic forming process under electromagnetic induction, so as to generate a sufficiently strong repulsive force between the aluminum-based material and a forming coil, which facilitates the implementation of the electromagnetic forming process.

The present invention is further directed to an electronic casing which is made of a metal laminate including a metal top layer and a metal bottom layer that are bonded by interface atom diffusion.

The present invention is still directed to an electronic casing in which a metal laminate is used to manufacture a casing blank, and the electronic casing of a more precise shape can be formed by an electromagnetic forming process.

In order to achieve the aforementioned objectives, the present invention provides a method of manufacturing an electronic casing, including the following steps. Step (a): a metal laminate and a die of a predetermined shape are provided. The metal laminate comprises a metal top layer and a metal bottom layer that are bonded by interface atom diffusion. Step (b): the metal laminate is processed to form a casing blank by using the die, and the casing blank has at least one turning portion. Step (c): a profiler of a predetermined shape and an electromagnetic forming device are provided. Step (d): the casing blank is attached to the profiler, and the electromagnetic forming device is disposed at a position corresponding to the turning portion. Step (e): the electromagnetic forming device is activated, so that the casing blank has a shape corresponding to the predetermined shape of the profiler.

In order to facilitate the examiner's understanding of the technical features and effects of the present invention, a preferred embodiment and the accompanying drawings are illustrated in detail below.

DETAILED DESCRIPTION OF THE INVENTION

A preferred embodiment of the method of manufacturing an electronic casing according to the present invention is described below. In order to make the illustration be more comprehensible, the same reference numbers will be used throughout the drawings to refer to the same or similar parts.

Figure 1:
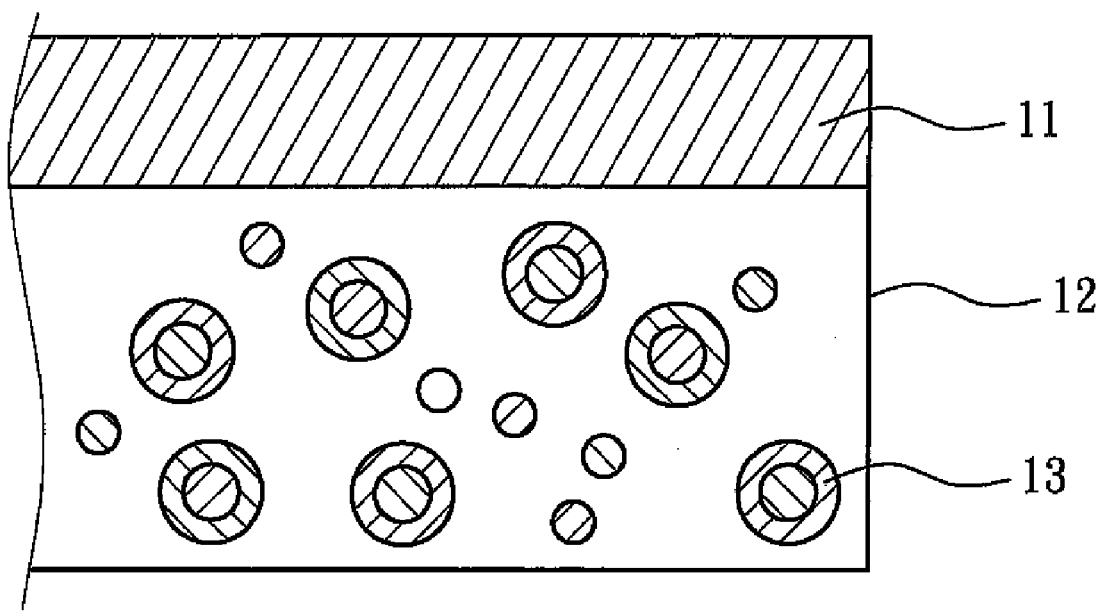
FIG. 1 shows a casing structure of a conventional electronic product.
Figure 2A:
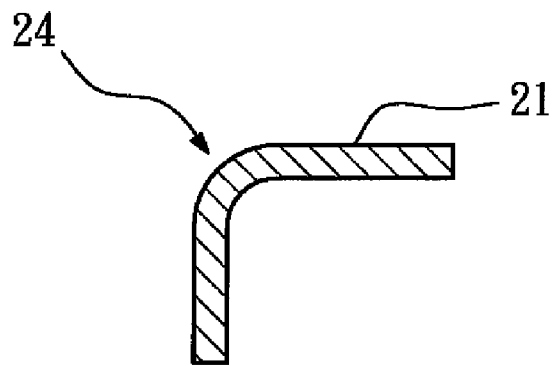
FIGS. 2A and 2B show a conventional electronic product forming process.
Figure 2B:
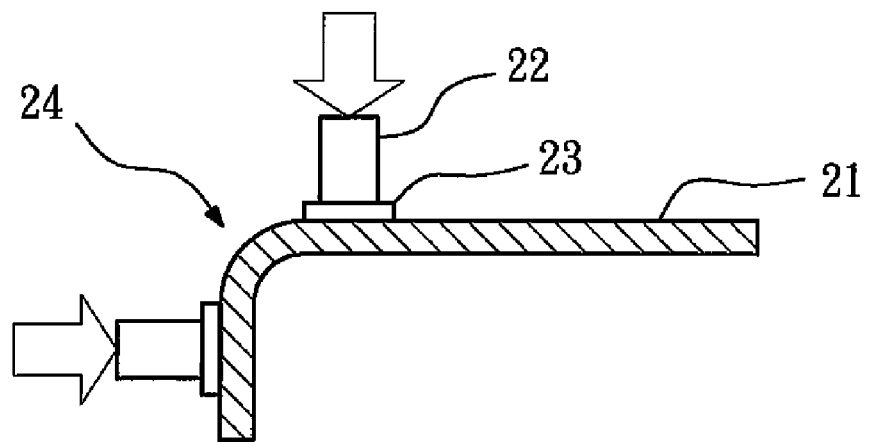
Figure 3:
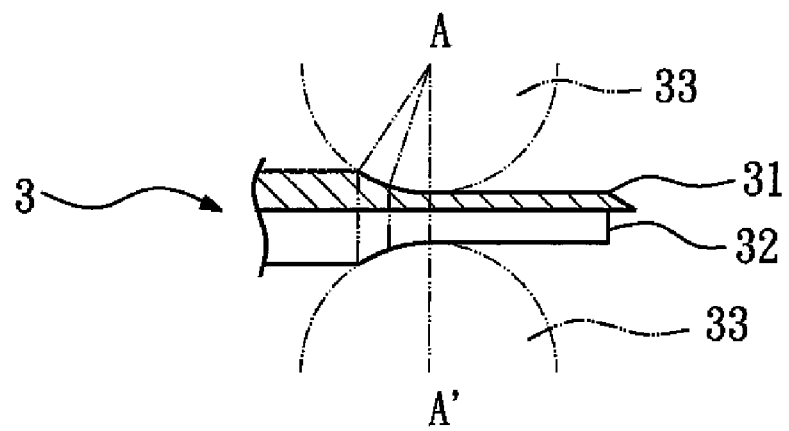
FIG. 3 is a schematic view of a method of manufacturing a metal laminate to form an electronic casing according to the present invention.
Figure 4:
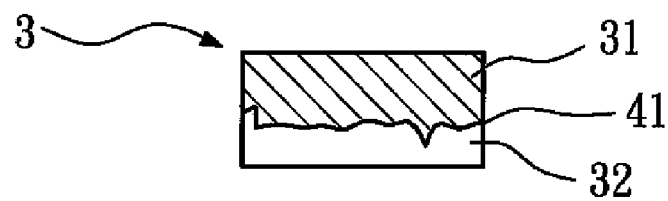
FIG. 4 is a cross-sectional view of the structure of FIG. 3 taken along a sectional line A-A'.

FIG. 3 is a schematic view of a method of manufacturing a metal laminate to form an electronic casing according to the present invention. FIG. 4 is a cross-sectional view of the structure of FIG. 3 taken along a sectional line A-A'. As shown in FIG. 3, a metal laminate 3 at least includes a metal top layer 31 and a metal bottom layer 32. The metal top layer 31 can be made of a titanium-based material (i.e., titanium or titanium alloy) or stainless, and can be certainly made of other metals. The metal bottom layer 32 can be made of an aluminum-based material (i.e., aluminum or aluminum alloy). The metal top layer 31 and the metal bottom layer 32 pass through a pair of rollers 33, and they are rolled by the pair of rollers 33, so that the metal top layer 31 and the metal bottom layer 32 are rolled and bonded by interface atom diffusion. Therefore, a diffusion zone 41 (as shown in FIG. 4) is formed and sandwiched between the metal top layer 31 and the metal bottom layer 32.

Figure 5:
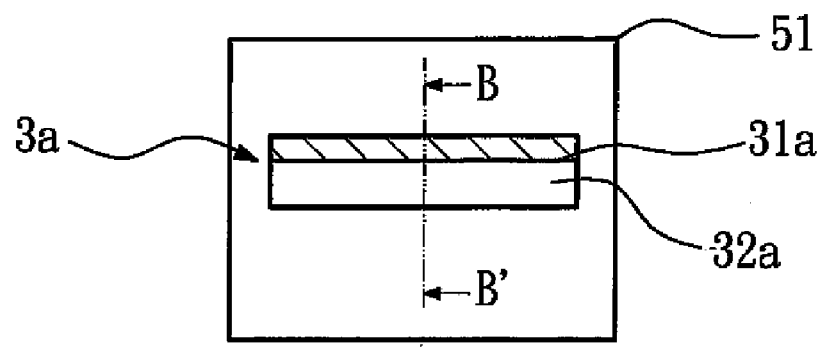
FIG. 5 is a schematic view of another method of manufacturing a metal laminate to form an electronic casing according to the present invention.
Figure 6:
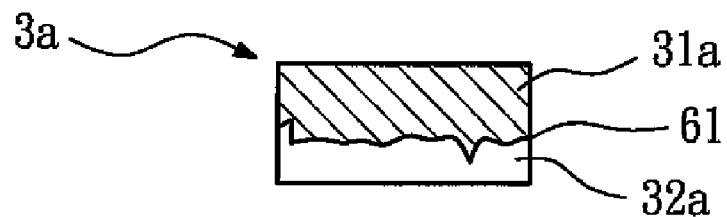
FIG. 6 is a cross-sectional view of the structure of FIG. 5 taken along a sectional line B-B'.

FIG. 5 is a schematic view of another method of manufacturing a metal laminate for forming an electronic casing according to the present invention; and FIG. 6 is a cross-sectional view of the structure of FIG. 5 taken along a sectional line B-B'. In FIGS. 5 and 6, the metal laminate 3a also includes a metal top layer 31a and a metal bottom layer 32a. The metal top layer 31a and the metal bottom layer 32a are stacked together and sent into a heating oven 51 for diffusion annealing, so that the metal top layer 31a and the metal bottom layer 32a are bonded by interface atom diffusion. A diffusion zone 61 (as shown in FIG. 6) is formed and sandwiched between the metal top layer 31a and the metal bottom layer 32a. The diffusion zone 61 is formed by destroying the interface between the metal top layer 31a and the metal bottom layer 32a, so that the stripping-off phenomenon of the interface between the metal top layer 31a and the metal bottom layer 32 is reduced. Certainly, in order to form the metal laminate structure 3 used in the electronic casing of the present invention, the metal top layer 31 and the metal bottom layer 32 can be first rolled and combined as shown in FIG. 3, and then sent into the heating oven 51 for diffusion annealing as shown in FIG. 5, so that the metal top layer 31 and the metal bottom layer 32 are bonded more tightly.

Figure 7A:
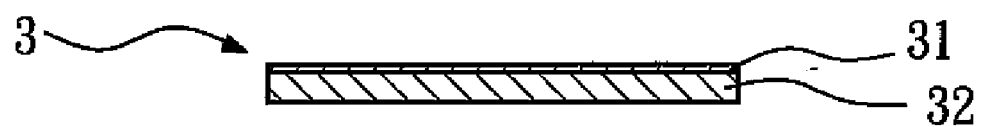
FIGS. 7A-7E are schematic views of a method of manufacturing an electronic casing according to a preferred embodiment of the present invention.
Figure 7B:
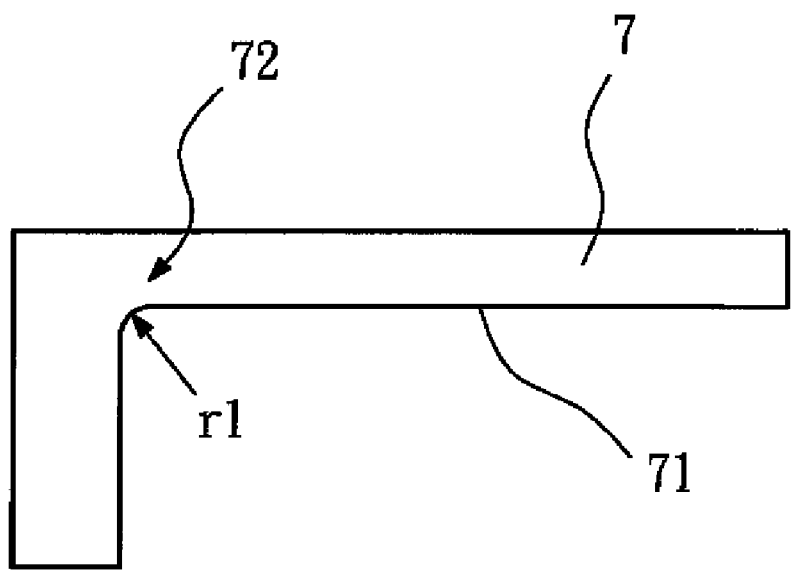

FIGS. 7A to 7E show the schematic views of a manufacturing method of an electronic casing according to a preferred embodiment of the present invention. In FIG. 7A, a metal laminate 3, a die of a predetermined shape (not shown), a profiler 7 (FIG. 7B) of a predetermined shape and an electromagnetic forming device 8 (FIG. 7D) are provided. The metal laminate 3 is formed by the above methods, which thus will not be described again here. In FIG. 7B, one side of the profiler 7 has a predetermined shape 71. For the convenience of illustration, the profiler 7 merely has one turning corner 72 in this preferred embodiment, and the turning corner 72 has a first radius of curvature r1. Certainly, the profiler 7 having the predetermined shape 71 can also have two or more turning corners 72. Persons skilled in the art can modify and implement such changes in terms of number and shape on the basis of the above description, and any modifications and variations without departing from the gist or spirit of the present invention all fall within the scope of the present invention, so they are not described here.

Figure 7C:
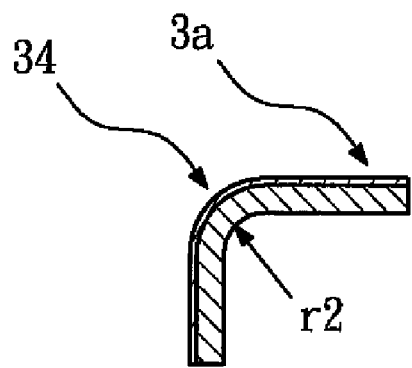

Then, in FIG. 7C, the metal laminate 3 is processed by using the die to form a casing blank 3a, in which the process can be one of stamping process, electromagnetic forming process, or forging process. The casing blank 3a has at least one turning portion 34, and the turning portion 34 has a second radius of curvature r2. The second radius of curvature r2 is greater than 2t (t is the thickness of the casing blank 3a), and the second radius of curvature r2 is greater than the first radius of curvature r1 (r2>r1). It is to be noted that the turning portion 34 may be disposed on the corner or sidewall of the casing blank 3a.

Figure 7D:
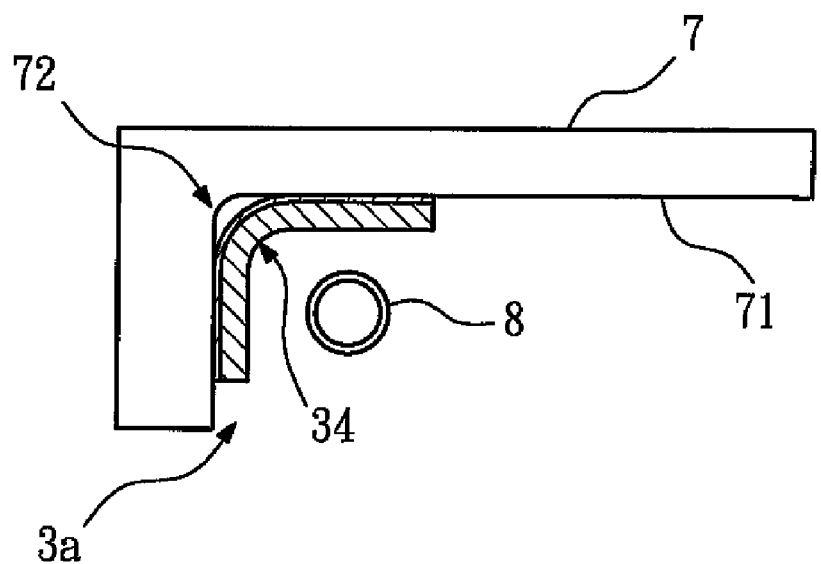

In FIG. 7D, the casing blank 3a is attached to the predetermined shape 71 of the profiler 7, and the turning portion 34 is made to correspond to the turning corner 72. Moreover, the electromagnetic forming device 8 is disposed on the other side of the casing blank 3a and corresponds to the turning portion 34.

Figure 7E:
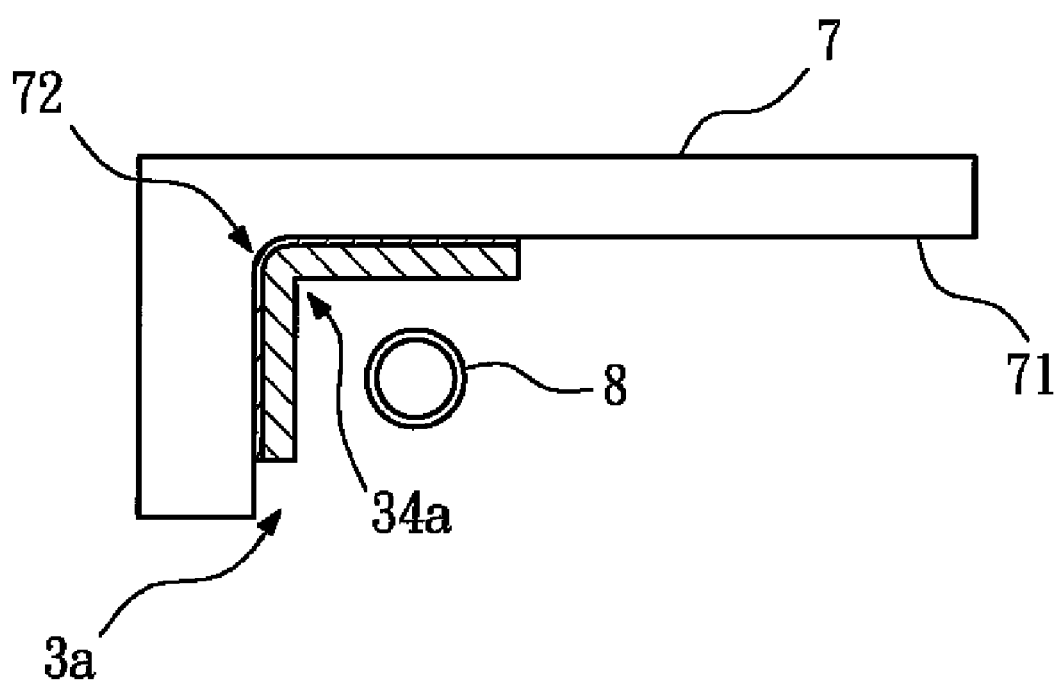

Finally, in FIG. 7E, the electromagnetic-forming device 8 is activated, and sufficiently strong eddy currents are generated near the metal bottom layer 32 under the effect of the transient pulse current changes of the electromagnetic forming device 8. The magnetic field induced by the eddy currents and the magnetic field induced by the electromagnetic forming device 8 are mutually repulsive, so the turning portion 34 of the casing blank 3a is forced to have plastic deformation, so as to be changed into a turning portion 34a. Under the electromagnetic forming force, the casing blank 3a is deformed very fast, which thus exhibits superplasticity, and shows excellent structural-forming capability. Therefore, the casing blank 3a has a shape corresponding to the predetermined shape 71 of the profiler 7, the second radius of curvature r2 of the turning portion 34a is made to be the same as the first radius of curvature r1 of the turning corner 72, and the material of the electronic casing will be formed into a more precise shape without destroying the metal top layer 31. The first radius of curvature r1 of the casing blank 3a is less than 1.5t (t is the thickness of the casing blank 3a).

Figure 8:
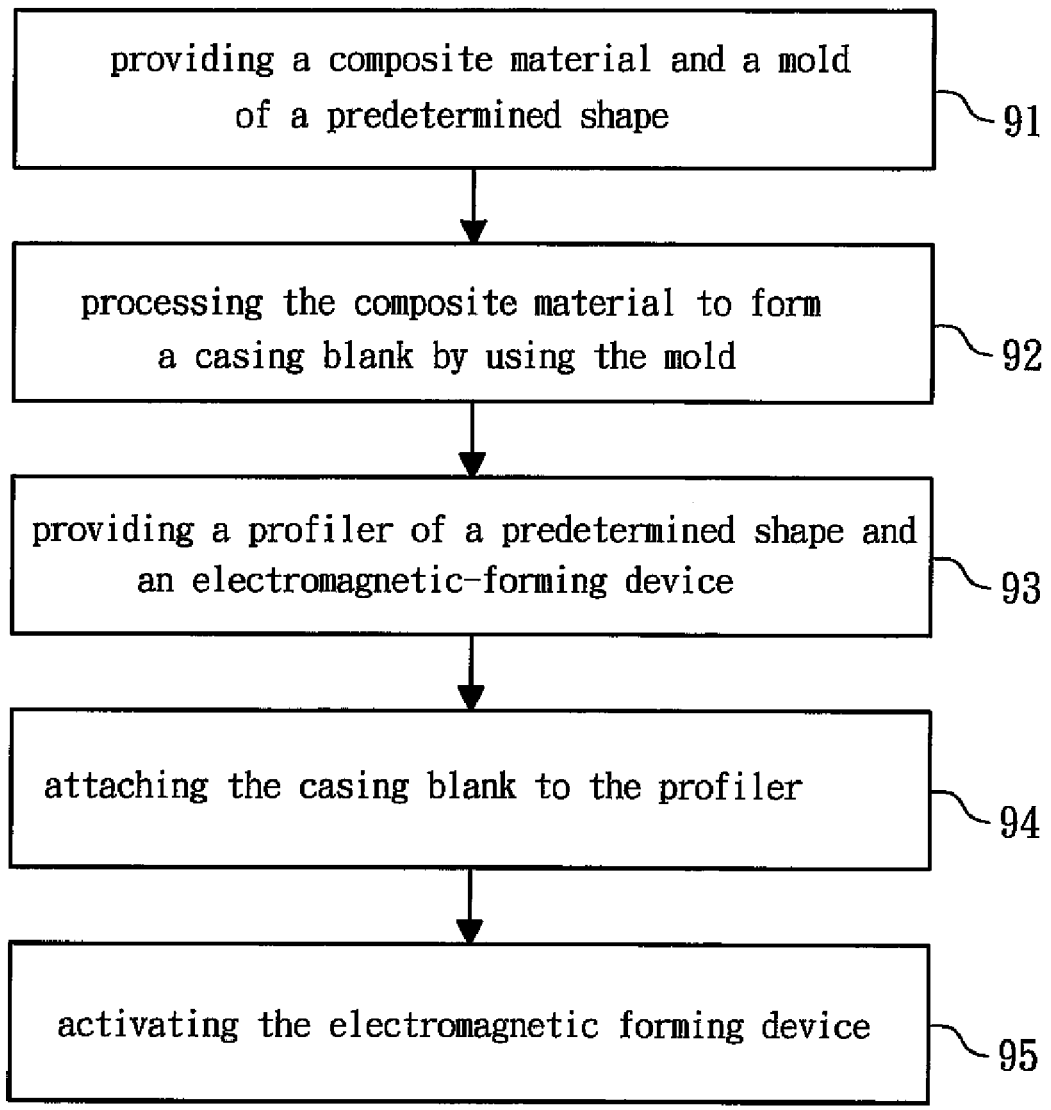
FIG. 8 is a flow chart of a manufacturing method of an electronic casing according to the present invention.

FIG. 8 shows a flow chart of a manufacturing method of an electronic casing according to the present invention. The method includes the following steps.

Step 91: a metal laminate and a die of a predetermined shape are provided, in which the metal laminate includes a metal top layer and a metal bottom layer that are bonded by interface atom diffusion.

Step 92: the metal laminate is processed to form a casing blank by using the die, and the casing blank has at least one turning portion. The turning portion has a second radius of curvature.

Step 93: a profiler of a predetermined shape and an electromagnetic forming device are provided. The profiler has a turning corner with a first radius of curvature. The second radius of curvature is greater than the first radius of curvature.

Step 94: the casing blank is attached to the profiler, and the electromagnetic forming device is disposed at a position corresponding to the turning portion.

Step 95: the electromagnetic forming device is activated, so that the casing blank has a shape corresponding to the predetermined shape. The radius of curvature of the turning portion is made to be the same as the first radius of curvature.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms illustrated, and that all modifications which maintain the spirit and scope of the present invention are within the scope defined in the appended claims.

What is claimed is:

1. A method of manufacturing an electronic casing, comprising:
   (a) providing a metal laminate and a die of a predetermined shape, wherein the metal laminate comprises a metal top layer and a metal bottom layer that are bonded by interface atom diffusion;
   (b) processing the metal laminate to form a casing blank by using the die, the casing blank having at least one turning portion with a second radius of curvature;
   (c) providing a profiler of a predetermined shape and an electromagnetic forming device, the profiler having a turning corner with a first radius of curvature, the second radius of curvature being greater than the first radius of curvature;
   (d) attaching the casing blank to the profiler, and disposing the electromagnetic forming device at a position corresponding to the turning portion; and
   (e) activating the electromagnetic forming device, so that the casing blank has a shape corresponding to the predetermined shape of the profiler, the radius of curvature of the turning portion being made to be the same as the first radius of curvature.

2. The method of claim 1, wherein in the step (a), the metal laminate is formed by one of a rolling and combining process, a diffusion annealing process, or a combination of the rolling and combining process and the diffusion annealing process.

3. The method of claim 1, wherein the metal top layer is made of a titanium-based material or stainless steel.

4. The method of claim 1, wherein the metal bottom layer is made of an aluminum-based material.

5. The method of claim 1, wherein in the step (b), the casing blank is formed by a stamping process, an electromagnetic forming process, or a forging process.

6. An electronic casing, manufactured by the method claimed in claim 1.

* * * * *